United States Patent
Woo

(10) Patent No.: US 7,480,513 B2
(45) Date of Patent: Jan. 20, 2009

(54) LOCATION BASED SERVICE SYSTEM AND POSITION INFORMATION UPDATING METHOD THEREOF

(75) Inventor: Sung-Ho Woo, MunChon (KR)

(73) Assignee: LG Electronics Inc., Seoul (KR)

(*) Notice: Subject to any disclaimer, the term of this patent is extended or adjusted under 35 U.S.C. 154(b) by 415 days.

(21) Appl. No.: 11/311,686

(22) Filed: Dec. 20, 2005

(65) Prior Publication Data

US 2007/0049289 A1   Mar. 1, 2007

(30) Foreign Application Priority Data

Aug. 25, 2005   (KR) .................. 10-2005-0078434

(51) Int. Cl.
*H04Q 7/20* (2006.01)
(52) U.S. Cl. .................. 455/456.6; 455/456.1; 455/457; 701/200; 701/202; 340/992
(58) Field of Classification Search .............. 455/456.6, 455/456.1, 457; 701/200, 202; 340/992
See application file for complete search history.

(56) References Cited

U.S. PATENT DOCUMENTS

| | | | |
|---|---|---|---|
| 5,754,125 A * | 5/1998 | Pearce .................. | 340/989 |
| 2002/0040271 A1* | 4/2002 | Park et al. .................. | 701/209 |
| 2003/0088359 A1* | 5/2003 | Park et al. .................. | 701/200 |
| 2004/0249565 A1* | 12/2004 | Park .................. | 701/200 |
| 2004/0260458 A1* | 12/2004 | Park et al. .................. | 701/200 |

* cited by examiner

*Primary Examiner*—Danh C Le
(74) *Attorney, Agent, or Firm*—McKenna Long & Aldridge, LLP

(57) ABSTRACT

A location based service system and a position information updating method thereof are disclosed. The position information updating method includes the steps of positioning an actual position through a global positioning system inside a mobile communication terminal, calculating predicted motion position of the mobile communication terminal, comparing the actual position extracted through the global positioning system with the calculated predicted motion position, and transmitting position related information obtained by the compared result to a position information server.

31 Claims, 7 Drawing Sheets

FIG. 6

| msid | time-stamp | coord(x,y,z) | velocity | angel |
|------|------------|--------------|----------|-------|
| 21 | 22 | 23 | 24 | 25 |

FIG. 10

| msid | time-stamp | coord(x,y,z) | velocity | angel | link_id |
|------|------------|--------------|----------|-------|---------|
| 31 | 32 | 33 | 34 | 35 | 36 |

LOCATION BASED SERVICE SYSTEM AND POSITION INFORMATION UPDATING METHOD THEREOF

This application claims the benefit of the Korean Patent Application No. 2005-0078434, filed on Aug. 25, 2005, which is hereby incorporated by reference as if fully set forth herein.

BACKGROUND OF THE INVENTION

1. Field of the Invention

The present invention relates to a location based service system and a position information updating method thereof, and more particularly, to a location based service system and a position information updating method thereof in which the number of times a message is transmitted to a position information server and the number of times a database in the position information server is updated are minimized.

2. Discussion of the Related Art

FIG. 1 is an exemplary view illustrating a basic configuration of a related art location based service system. Referring to FIG. 1, the related art location based service system includes a mobile communication terminal 10, receiving position information provided from a plurality of satellites 20, and a position information server 40 receiving position message transmitted from the mobile communication terminal 10 in a wireless mode through a base station 30.

With the development of mobile communication terminals provided with a global positioning system (GPS), various types of location based services (LBS) are being developed. A position information server is required for location based services. The position information server acquires and manages user (i.e., mobile communication terminal) location.

Each moving object basically derives its position (i.e., location) and transmits the position result to the position information server through a wireless communication network to continuously update a position value in the server, so that the position information server maintains a position value having a desired accuracy level. Since the server always maintains the user's current position, the user can promptly be informed of traffic jam, accident, and emergency situations. Additionally, the user's position can quickly be acquired.

To allow the position information server to acquire the user's position, the related art provides a method for periodically (i.e., specified time intervals) requesting the user's position, and a method for acquiring the user's position following a request depending on the types of services.

FIG. 2 is a flow chart illustrating a related art position information updating method. Referring to FIG. 2, a current position value is calculated at a predetermined time $t_{def}$ in step S21. The mobile communication terminal 10 then transmits the calculated position value to the position information server 40 in step S22. Then, in accordance with decision step S23, a determination is made as to whether time t is equal to the predetermined time $t_{def}$. If time t is not equal to $t_{def}$, in accordance with the "NO" path out of decision step 23, the method proceeds by looping back and continually checkup whether time t is equal to $t_{def}$. If, however, time t is equal to $t_{def}$ in accordance with the "YES" path out of decision step S23, the mobile communication terminal 10 calculates its current position based on global positioning system data per step S21.

FIG. 3 is a block diagram illustrating the data format of a position message transmitted by the mobile communication terminal 10 to the position information server in accordance with the related art. Referring to FIG. 3, the message includes a mobile communication terminal identifier msid 11, the position acquisition time_stamp 12, and the position coordinate value coord(x,y,z) 13.

FIG. 4 is a flow chart illustrating another related art position information updating method. This method is identical with the periodically updating method in that the mobile communication terminal 10 derives its position at a constant time interval 't'. However, in the method of FIG. 4, the mobile communication terminal 10 does not always transmit the derived position value to the server. Instead, the mobile communication terminal calculates the difference between the current position and the position registered in the server (i.e., the previous position transmitted to the server). If the difference is within (e.g., less than) a threshold value, the derived position value is not transmitted to the server. If the difference is beyond (e.g., greater than) the threshold value, the position value is transmitted to the server to update the position value stored therein. The message is transmitted to the server in the same manner as the periodically updating method.

Accordingly, and as shown in FIG. 4, the mobile communication terminal 10 derives the current position value and stores the value in a memory therein. Then, the mobile communication terminal 10 registers this position value in the server in step S41. After the lapse of a certain period of time, the mobile communication terminal 10 derives the current position value again in step S42, and compares the derived value with the value previously stored in the memory. If the difference between the derived value and the previous value exceeds an allowable threshold value (i.e., error range) as shown by the "YES" path out of step S43, the mobile communication terminal 10 transmits a position message containing the current position to the position information server to update the position value stored in the server, as shown by step S44. At this time, the position message transmitted to the server is also stored in the memory inside the mobile communication terminal 10.

Frequent message transmission and frequent updating of the database in the server are required so that the position information server can maintain a high degree of position accuracy. If the position value is periodically updated, the server should be updated at a period of a certain time 't' as much as the number of moving objects for position collection. A threshold value based position is updated only if the current position is varied at a threshold value or greater than the previous position. Therefore, in case of a vehicle having high mobility per time, frequent update of the server is required. In this regard, it would be highly beneficial to have a method that reduces the number of times message transmission is required, and the number of times the database at the server must be updated.

SUMMARY OF THE INVENTION

Accordingly, the present invention is directed to a location based service system and a position information updating method thereof, which substantially obviate one or more problems due to limitations and disadvantages of the related art.

An object of the present invention is to provide a location based service system and a position information updating method thereof in which the number of times message transmission is required, and the number of times the database at the position information server must be updated are reduced.

Another object of the present invention is to provide a location based service system and a position information updating method thereof in which a position information server maintains user position values within a given error range.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the methods and structures particularly pointed out in the written description, including the drawings, and the claims.

In accordance with one aspect of the present invention, the above-identified and other advantages are achieved by a position information updating method that involves calculating a predicted position of a mobile communication terminal and calculating an actual position of the mobile communication terminal based on global positioning system signals received by the mobile communication terminal. The actual position and the predicted position are then compared and, based on the result of the comparison, position related information is transmitted to a position information server.

In accordance with another aspect of the present invention, the above-identified and other advantages are achieved by a location based service system. The system includes a position information server and a mobile communication terminal in wireless communication with the position information server. The position information server is configured to receive position information relating to the actual position of the mobile communication terminal and, after the lapse of a certain amount of time, calculate a predicted position value of the mobile communication terminal based on the received position. The mobile communication terminal, in turn, comprises a global positioning system and a controller, where the global positioning system is configured to derive actual mobile communication terminal position and the controller is configured to calculate a predicted position value, in the same manner as the position information server. The controller is further configured to compare the predicted position value to a current, actual position value. The mobile communication terminal is configured to transmit to the position information server, depending on the result of the comparison, updated position information relating to the current, actual position of the mobile communication terminal.

In accordance with still another aspect of the present invention, the above-identified and other advantages are achieved by a mobile communication terminal. The mobile communication terminal includes a global positioning system configured to calculate, at a first time, actual mobile communication terminal position based on signals received from Global Positioning System satellites. The mobile communication terminal further includes a controller configured to predict, at a second time subsequent to said first time, the position of the mobile communication terminal based on the calculated actual position, and based on mobile communication terminal velocity and motion angle. The controller is also configured to compare the predicted position with an updated, actual position of the mobile communication terminal. The mobile communication terminal further includes a transmitter transmitting position related information to a position information server based on the result of the comparison.

In yet another aspect of the present invention, the above-identified and other advantages are achieved by a position information updating method. The method involves receiving first position related information for a mobile communication terminal and calculating a predicted position for the mobile communication terminal based on the first position related information. The method then involves determining whether second position related information from the mobile communication terminal has been received and setting a current position of the mobile communication terminal equal to the predicted position if it is determined that the second position related information has not been received.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a block diagram illustrating the data that may be contained in a position related message according to the first exemplary embodiment of the present invention;

FIG. 10 is a block diagram illustrating the data that may be contained in a position related message according to the second exemplary embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, a mobile communication terminal and a position information server each calculate a predicted position value "pred_pos," based on the same previously calculated actual position value, and in the same way, in a synchronized manner. Thus, the position information server calculates a predicted position value at some point in time after receiving actual position data from the mobile communication terminal, where the server registers the actual position data upon receiving it from the mobile communication terminal, and where the server recognizes the predicted position value as the current position value. Likewise, the mobile communication terminal calculates a predicted position value based on the same actual position value that was transmitted to and registered in the server. The mobile communication terminal then compares the predicted position value with an updated (i.e., current) actual position value and, if the difference between the updated actual position value and the predicted position value exceeds a threshold value, the mobile communication terminal transmits a position message to the position information server, where the message contains, among other things, information that reflects the updated, actual position value of the mobile communication terminal, wherein the position information server then registers the updated, actual position value upon receipt.

Unlike the existing threshold value based position updating method, in the present invention, determining whether to update the position registered at the server is based on the amount of error between the predicted position value and the actual, current position value. Therefore, the accuracy of the predicted position determines the efficiency of the method according to the present invention. Three exemplary methods employing position prediction, in accordance with the present invention, are now described herein below.

1. Method for Predicting Position Based on Velocity and Motion Angle

Figure 1:
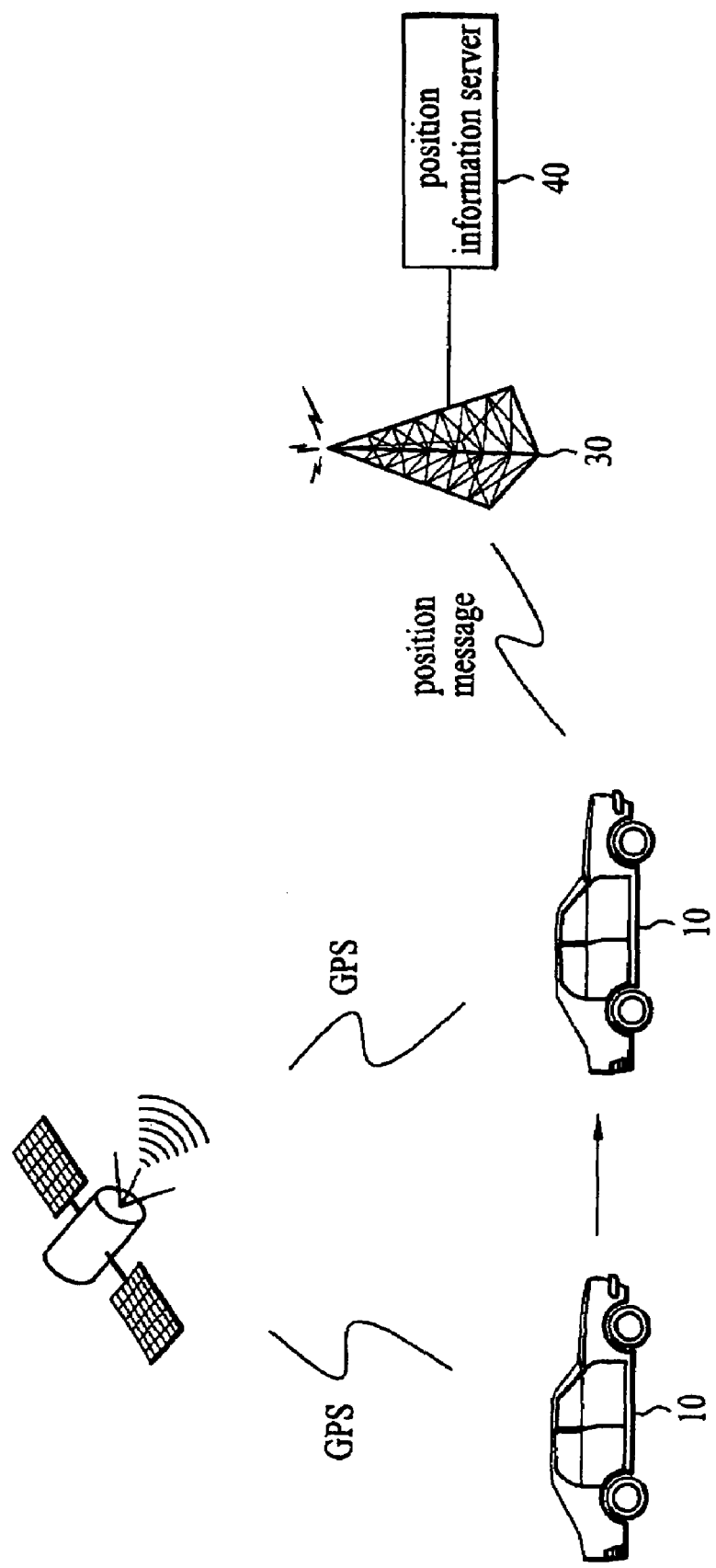
FIG. 1 is an exemplary view illustrating a basic configuration of a related art location based service system.
Figure 3:
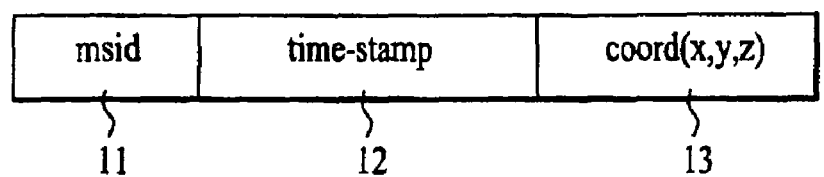
FIG. 3 is a block diagram illustrating the data format of a position message transmitted to a position information server in accordance with the related art.
Figure 2:
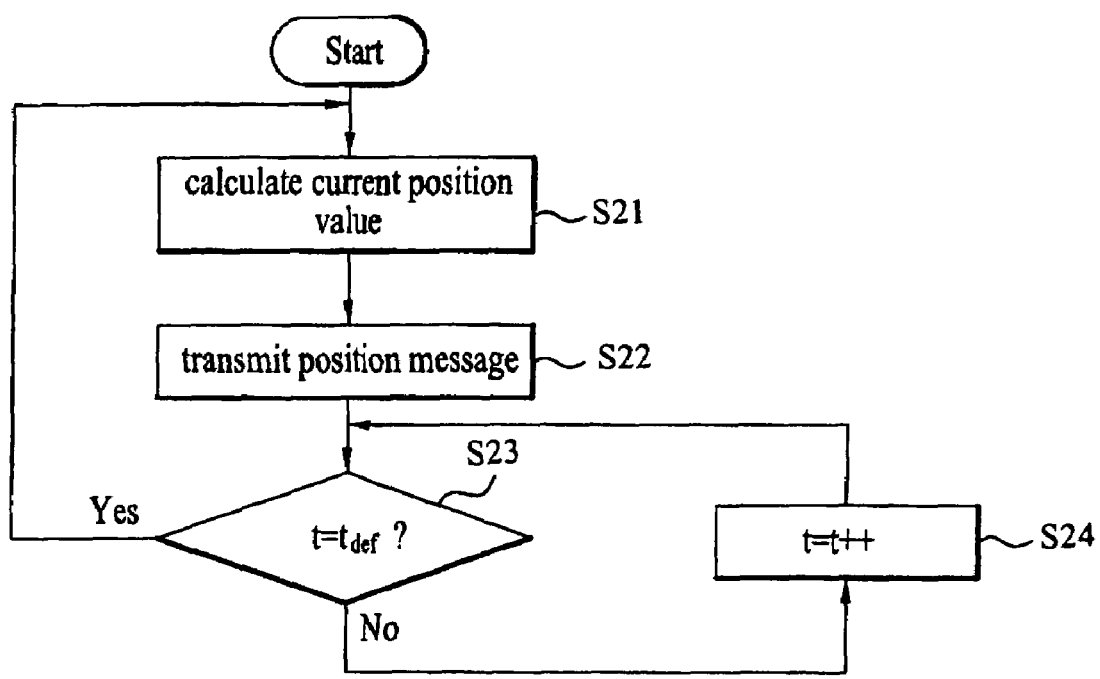
FIG. 2 is a flow chart illustrating a related art position information updating method.
Figure 4:
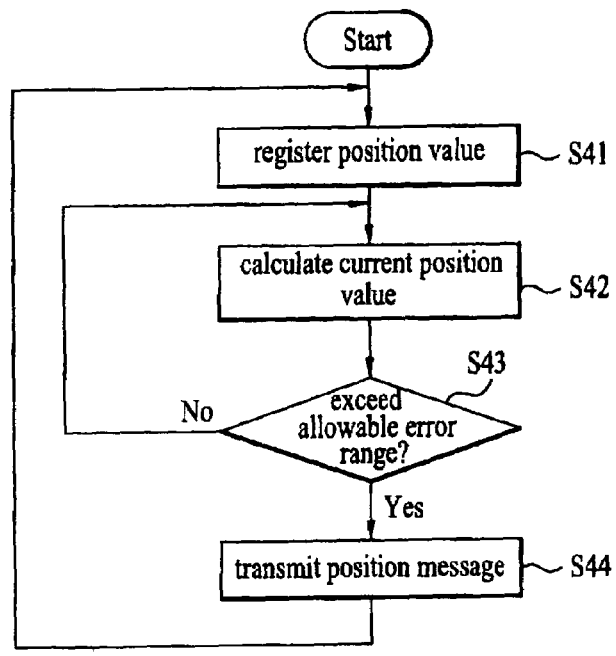
FIG. 4 is a flow chart illustrating another related art position information updating method.
Figure 5:
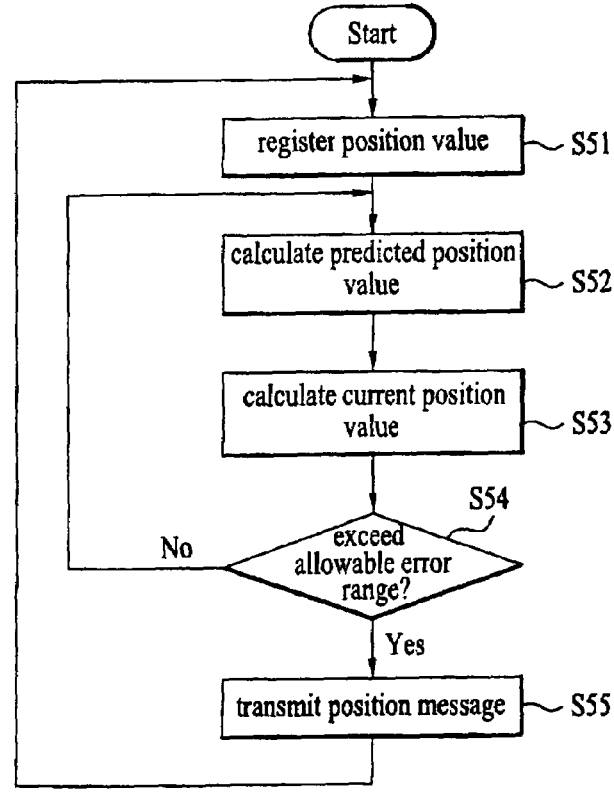
FIG. 5 is a flow chart illustrating a position information updating method for a mobile communication terminal according to a first exemplary embodiment of the present invention.

FIG. 5 is a flow chart illustrating a position information updating method according to a first exemplary embodiment of the present invention.

After the actual, calculated position of a mobile communication terminal is registered at the position information server at a certain time "r" (time_stamp=r) in step S51, the mobile communication terminal calculates a predicted position value at a time "r+t" based on the previously calculated, actual position value, as well as the velocity and motion angle of the mobile communication terminal, which the mobile communication terminal derives from GPS data, per step S52. When the position message containing the information relating to the actual, calculated position was transmitted to and registered at the position information server, the position message, as illustrated in FIG. 6, also contained the same velocity 24 and motion angle 25 information. Thus, the position information registered in the position information server includes velocity and motion angle. As such, the server can, at the time "r+t", calculate a predicted position value for the mobile communication terminal assuming constant velocity and constant motion angle from the time "r" to the time "r+t", in the same manner the predicted position value was calculated by the mobile communication terminal in step S52.

It is noted that the position related message, as illustrated in FIG. 6, further comprises position related information including position information coord(x,y,z). This position information coord(x,y,z) may comprise the actual, current position coordinates of the mobile communication terminal, as calculated by the mobile communication terminal or, alternatively, the position information coord(x,y,z) may comprise error data, where the error data represents, for example, the difference between the previously calculated position coordinates of the mobile communication terminal and the current or present calculated position coordinates. In the latter case, the actual, current position coordinates can be obtained by adding the error data to the previous position coordinates.

Referring back to FIG. 5, the mobile communication terminal then calculates an updated (i.e., current) actual position value based on signals received from GPS satellites, as set forth in step S53.

The mobile communication terminal then calculates the difference between the predicted position, calculated in step S52, and the updated actual position value calculated in step S53. The mobile communication terminal then compares the difference with a threshold value corresponding to an allowable error range in step S54.

If the calculated difference value is greater than the threshold value, in accordance with the YES path out of step S54, the mobile communication terminal transmits a position message to the position information server, as shown by step S55, to update the position value registered at the position information server, per step S51.

Figure 7:
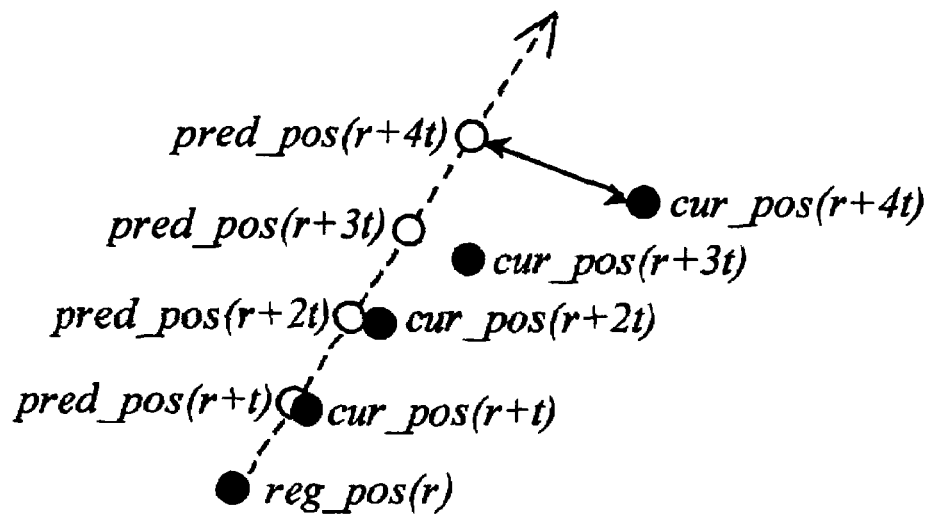
FIG. 7 is a diagram illustrating an example of position prediction according to exemplary embodiments of the present invention.

FIG. 7 is an exemplary diagram illustrating the position prediction and update method based on constant velocity and motion angle. Referring to FIG. 7, "cur_pos" represents an actual, calculated position value of the mobile communication terminal at various time intervals "r+nt"; "reg_pos" represents a position value of the mobile communication terminal transmitted to and registered in the server; and "pred_pos" represents a predicted position value of the mobile communication terminal at the same time intervals "r+nt". Each black dot represents an actually position, while each white dot represents a predicted position. If the position value "reg_pos (r)" of the mobile communication terminal has been registered in the position information server at the time interval "r", the predicted position value "pred_pos" and the current position value "cur_pos" are obtained at various "n" intervals of time "t". At each interval, a determination is made as to whether the difference between the two position values "pred_pos(r+t)" and "cur_pos(r+t)" is greater than the threshold value. The period "t" may be set in inverse proportion to motion velocity as the case may be. If, for example, it is determined that the difference between the two position values "pred_pos(r+t)" and "cur_pos(r+t)" is greater than the threshold value at, for example, time interval "r+4t", a position message is transmitted to the position information server.

Figure 8:
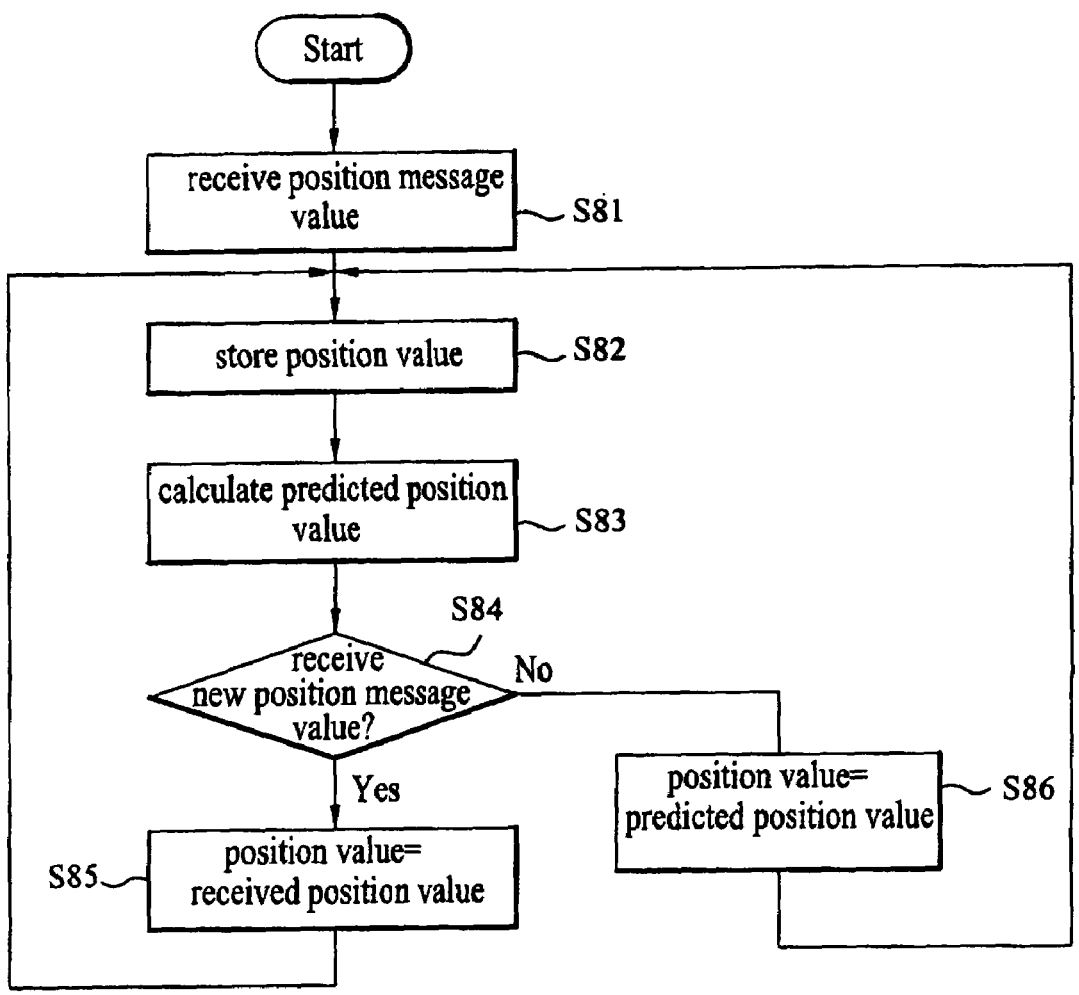
FIG. 8 is a flow chart illustrating a position information updating method for a mobile communication terminal according to the first exemplary embodiment of the present invention from the perspective of a position information server.

FIG. 8 is a flow chart illustrating the position information updating method according to the first exemplary embodiment, from the perspective of the position information server. As illustrated, the position information server receives the position message from the mobile communication terminal in step S81, and stores the received position value in a memory or database in step S82. Subsequently, the position information server calculates a predicted position value for the mobile communication terminal in the same way, and at the same or substantially the same time interval as the mobile communication terminal, as shown in step S83, and in a synchronized manner.

The position information server then determines whether a new position message has been received from the mobile communication terminal in step S84. If a new position message has been received from the mobile communication terminal, in accordance with the YES path out of step S84, the position information server sets the position value contained in the received position message as the current position value, as shown in step S85. If no position message has been received from the mobile communication terminal, in accordance with the NO path out of step S84, the position information server uses the predicted position value as the current position value in step S86.

Figure 9:
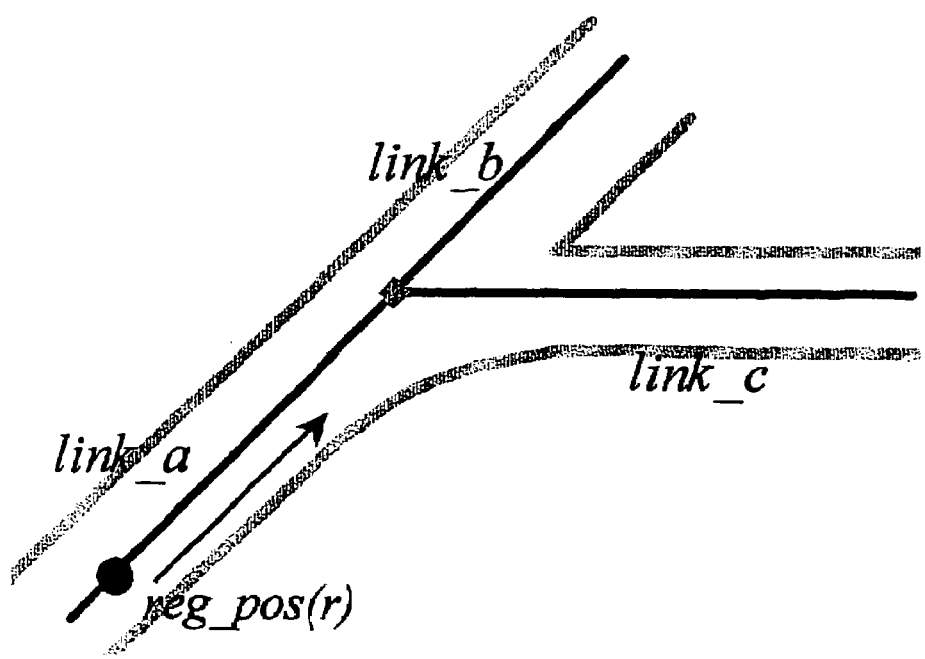
FIG. 9 is a diagram illustrating links along a roadway according to a second exemplary embodiment of the present invention.

2. Method for Predicting Position Using a Road Network Database Based Position In accordance with this exemplary embodiment, the position of the mobile communication terminal is predicted based on information relating to a road on which the mobile is located. In this embodiment, roads are segmented into units called links. FIG. 9 illustrates three such links: link_a, link_b, and link_c which surround an intersection. To this end, the position information server and the mobile communication terminal possess the same road network database. Moreover, the mobile communication terminal and the position information server recognize the corresponding link on which the mobile is currently positioned, through map matching techniques. Therefore, the position message transmitted to the position information server will preferably include link related information message, such as link_id 36, as shown in FIG. 10.

To further illustrate this exemplary embodiment, the position "reg_pos(r)" of the mobile communication terminal is registered with the position information server at time "r". The mobile is, at time "r", positioned on link_a and advancing along the arrow as shown in FIG. 9. In accordance with this embodiment, the predicted position value of the mobile is calculated based on an assumption that the mobile is moving along link_a at a constant velocity and a constant motion angle. After calculating the predicted position value, the mobile communication terminal compares the predicted position value with a current, actual position value. If the difference between the predicted position value and the actual position value exceeds a threshold value corresponding to an allowable error range, the mobile communication terminal transmits a position message conveying information relating to the actual, current position to the position information server, so as to update the position value registered at the position information server. In the interim, the position information server also calculates a predicted position value for the mobile in the same manner.

Figure 11:
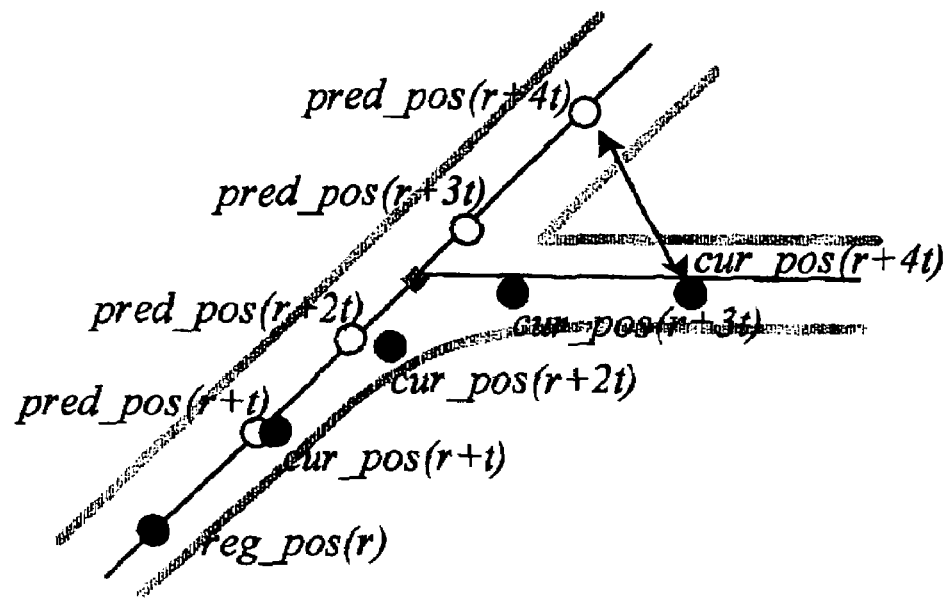
FIG. 11 is a diagram illustrating an example of road network based position prediction according to the second exemplary embodiment of the present invention.

FIG. 11 is a diagram illustrating position prediction as the mobile communication terminal moves along link_a, through the intersection and onto link_c. As illustrated in FIG. 11, the mobile communication terminal and the position information terminal may, in predicting the position of the mobile communication terminal, assume that the mobile moves from link_a to link_b. However, in this example, the mobile actually moves from link_a to link_c. When, for example, at time "r+4t", the difference between the predicted position value "pred_pos(r+4t)" and the current, actual position value "cur_pos(r+4t)" exceeds a threshold value, updated, actual position information in the form of a position message, such as the position message illustrate in FIG. 10, is transmitted to the position information server.

To minimize the error between the predicted position value and the actual position value, it is necessary to more accurately predict the direction (i.e., which link) the mobile will travel along as it goes through the intersection as illustrated, for example, in FIG. 9. To this end, there are two preferred methods as follows.

A: Prediction based on the relative size of the road, wherein the prediction involves selecting the link (road), that is largest (e.g., widest) among all the links accessible from the intersection. The assumption is, the larger the road, the more likely it is the mobile communication terminal will follow that link as opposed to the other links.

B: Prediction based on the straightest link, where more specifically, prediction involves selecting the link having an angle closest to 180° relative to the current link (i.e., the link on which the mobile communication terminal is currently located) as compared to the other links accessible from the intersection.

3. Method for Predicting Traffic Pattern

In this exemplary embodiment, it is assumed that the mobile communication terminal and the position information server have the same traffic pattern database as each other. Further in accordance with this embodiment, the predicted position of the mobile is based on a velocity which, in turn, is based on traffic pattern information. More specifically, to enhance the accuracy of the position prediction, the position information server and the mobile communication terminal employ a more accurate velocity. To this end, both the mobile communication terminal and the position information server predict position based on a velocity value associated with the current link and predefined traffic patter data corresponding to the current link.

Table 1 illustrates timed traffic pattern data for the three exemplary links, link_a, link_b and link_c.

TABLE 1

| Link_id | 07:00~09:00 | 09:00~17:00 | 17:00~21:00 | 21:00~07:00 |
|---------|-------------|-------------|-------------|-------------|
| Link_a  | 40%         | 90%         | 60%         | 100%        |
| Link_b  | 50%         | 90%         | 70%         | 100%        |
| Link_c  | 70%         | 80%         | 70%         | 100%        |

Table 2 illustrates timed timing traffic pattern data that may be used in predicting position when the mobile communication terminal passes through an intersection, such as the intersection illustrated in FIG. 9.

TABLE 2

| Branch | 07:00~09:00 | 09:00~17:00 | 17:00~21:00 | 21:00~07:00 |
|--------|-------------|-------------|-------------|-------------|
| link_a -> link_b | 30% | 70% | 40% | 100% |
| link_a -> link_c | 50% | 90% | 70% | 100% |

The symbol "%" in the traffic pattern tables 1 and 2 indicates that the velocity used in predicting the position of the mobile is a certain percentage (as shown) of a predetermined or average velocity for a given link at a given time. If the mobile advances from link_a to link_b as shown in FIG. 11, the velocity of the mobile in link link_b is assumed based on the predefined traffic pattern information. For example, if the mobile advances from link_a to link_c during the morning rush hour between 07:00 and 09:00, it is assumed that the speed of the mobile is maintained, for example, at 40 km/h which corresponds to 50% of a predetermined or average speed for link_c, for example, 80 km/h.

Figure 12:
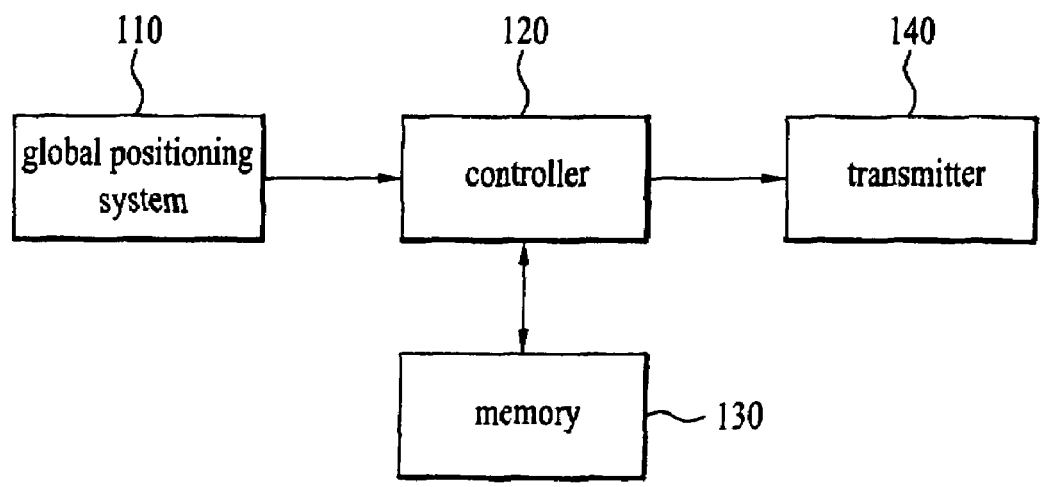
FIG. 12 is a block diagram illustrating a mobile communication terminal according to exemplary embodiments of the present invention.

To update the position information, the mobile communication terminal may be constructed as shown in FIG. 12. The mobile communication terminal includes a global positioning system 110 extracting position and timing information based on a plurality of signals received from GPS satellites, a controller 120 predicting a subsequent position value depending on velocity and motion angle, and generating a control signal for updating the position information if an error between the predicted position value and a current position value provided by the global positioning system 110 is greater than a threshold value. The mobile communication terminal would also comprise a memory 130 temporarily storing information required for the operation of the controller 120. In addition, the mobile would have a transmitter 140 transmitting a position message including the current position value to the position information server depending on the control signal generated by the controller 120.

With regard to the aforementioned embodiments that rely on road network and/or traffic pattern data, it would be advantageous to incorporate into the mobile communication terminal the ability to turn ON and OFF any mode that specifically utilizes this information to calculate the position of the mobile communication terminal. Thus, for example, if the user of the mobile communication terminal is not traveling along a roadway, the user has the option of turning OFF any such mode, whereby the mobile communication terminal would cease to employ any location based service or, alternatively, the mobile communication terminal may automatically or upon selection by the user, provide location based services in accordance with the first exemplary embodiment described above in section 1, which does not use or rely upon road network and/or traffic pattern data.

As described above, the location based service system and the position information updating method described herein, according to the present invention, have the following advantages. The number of times the mobile must transmit a position message to the position information server and the number of times position information server must update the database are reduced, therefore reducing the load on the overall system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A position information updating method comprising the steps of:
   calculating the actual position of a mobile communication terminal based on global positioning system signals received by the mobile communication terminal;
   calculating a predicted position of the mobile communication terminal;
   comparing the actual position with the predicted position; and
   based on the result of said comparison, transmitting mobile communication terminal position related information to a position information server, if said comparison indicates a difference between the calculated actual position and the predicted position and the difference is greater than a specified threshold value,
   wherein the position related information includes information relating to at least one road to which the mobile communication terminal is proximately located, and
   wherein the step of calculating the predicted position comprises selecting one of at least two roads associated with an intersection, through which the mobile communication terminal is or will be traveling, based on the relative size of the at least two roads compared to each other.

2. The position information updating method as claimed in claim 1, wherein the position related information includes position error correction data.

3. The position information updating method as claimed in claim 1, wherein the position related information includes actual position data of the mobile.

4. The position information updating method as claimed in claim 3, wherein the position related information includes mobile communication terminal velocity and motion angle.

5. The position information updating method as claimed in claim 4, wherein the position information server calculates a predicted position for the mobile communication terminal based on the velocity and the motion angle of the mobile communication terminal.

6. The position information updating method as claimed in claim 1 further comprising:
   predicting the position of the mobile communication terminal at the position information server based on the position related information received from the mobile communication terminal.

7. The position information updating method as claimed in claim 6, wherein the predicted position of the mobile communication terminal is based on an estimated mobile communication terminal velocity, and wherein the estimated mobile communication terminal velocity is based on traffic pattern data.

8. The position information updating method as claimed in claim 6, wherein the predicted position of the mobile communication terminal is periodically performed at a certain predefined time interval.

9. The position information updating method as claimed in claim 8, wherein the position prediction at the mobile communication terminal and the position prediction at the position information server are synchronized.

10. A location based service system comprising:
    a position information server; and
    a mobile communication terminal in wireless communication with said position information server,
    wherein said position information server is configured to receive position information relating to the actual position of the mobile communication terminal and, after the lapse of a certain amount of time, calculate a predicted position value of the mobile communication terminal based on the received position; and
    wherein said mobile communication terminal comprises a global positioning system and a controller, said global positioning system configured to derive actual mobile communication terminal position and said controller configured to calculate a predicted position value, in the same manner as the position information server, and configured to compare the predicted position value to a current, actual position value, via the global positioning system, said mobile communication terminal configured to transmit position related information to the position information server, if said comparison indicates a difference between the specified threshold value,
    wherein the position information related to the actual position further includes information relating to at least one road to which the mobile communication terminal is proximately located, and
    wherein the position prediction performed by the mobile communication terminal controller and the position information server involves selecting one of at least two roads associated with an intersection, through which the mobile communication terminal is or will be traveling, and wherein the selection of said one road is based on the relative size of the at least two roads compared to each other.

11. The location based service system as claimed in claim 10, wherein the position information relating to the current, actual position of the mobile communication terminal includes position error correction data to correct the difference.

12. The location based service system as claimed in claim 10, wherein the position related information includes current, actual position data of the mobile communication terminal to correct the difference.

13. The location based service system as claimed in claim 12, wherein the position related information includes mobile communication terminal velocity and motion angle.

14. The location based service system as claimed in claim 13, wherein the position information server calculates a predicted position of the mobile communication terminal based on the velocity and the motion angle of the mobile communication terminal.

15. The location based service system as claimed in claim 10, wherein the position prediction performed by the mobile communication terminal controller and by the position information server involves estimating the velocity of the mobile communication terminal, and wherein the estimated mobile communication terminal velocity is based on traffic pattern data.

16. The location based service system as claimed in claim 10, wherein the position prediction is performed by the mobile communication terminal controller and by the position information server at a certain predefined time interval.

17. The location based service system as claimed in claim 16, wherein the position prediction performed by the mobile communication terminal controller and the position prediction performed by the position information server are synchronized.

18. A mobile communication terminal comprising:
a global positioning system configured to calculate, at a first time, actual mobile communication terminal position based on signals received from Global Positioning System satellites;
a controller configured to predict, at a second time subsequent to said first time, the position of the mobile communication terminal based on the calculated actual position, and based on mobile communication terminal velocity and motion angle, said controller further configured to compare the predicted position with an updated, actual position of the mobile communication terminal; and
a transmitter configured to transmit position related information to a position information server based on the result of the comparison, if said comparison indicates a difference between the updated, actual position and the predicted position and the difference is greater than a specified threshold value,
wherein the position related information includes information relating to at least one road to which the mobile communication terminal is proximately located, and
wherein the position prediction performed by the mobile communication terminal controller involves selecting one of at least two roads associated with an intersection, through which the mobile communication terminal is or will be traveling, and wherein the selection of said one road is based on the relative size of the at least two roads compared to each other.

19. The mobile communication terminal as claimed in claim 18, wherein the position related information includes position error correction data.

20. The mobile communication terminal as claimed in claim 18, wherein the position related information includes updated position data.

21. The mobile communication terminal as claimed in claim 20, wherein the position related information includes mobile communication terminal velocity and motion angle.

22. The mobile communication terminal as claimed in any one of claim 18, wherein the position prediction is periodically performed at a certain time interval.

23. The mobile communication terminal as claimed in claim 22, wherein the position prediction performed by the mobile communication terminal controller is synchronized with a position prediction performed by a position information server, wherein the position prediction performed by the position information server is based on the position related information transmitted by the mobile communication terminal.

24. In a mobile communication system, a position information updating method comprising:
receiving first position related information for a mobile communication terminal;
calculating a predicted position for the mobile communication terminal based on the first position related information;
determining whether second position related information from the mobile communication terminal has been received;
setting a current position of the mobile communication terminal equal to the predicted position if and only if it is determined that the second position related information has not been received.

25. The position updating method of claim 24 further comprising the step of:
setting the current position of the mobile communication terminal equal to an actual position based on the second position related information, if it has been determined that the second position related information has been received.

26. The position updating method of claim 24, wherein the first and the second position related information includes velocity and motion angle information relating to the mobile communication terminal.

27. The position updating method of claim 26, wherein the first and the second position related information includes information that reflects the actual position of the mobile communication terminal at different times.

28. A position information updating method comprising the steps of:
calculating the actual position of a mobile communication terminal based on global positioning system signals received by the mobile communication terminal;
calculating a predicted position of the mobile communication terminal;
comparing the actual position with the predicted position; and
based on the result of said comparison, transmitting mobile communication terminal position related information to a position information server,
wherein the position related information includes information relating to at least one road to which the mobile communication terminal is proximately located, and
wherein the step of calculating the predicted position comprises selecting one of at least two roads associated with an intersection, through which the mobile communication terminal is or will be traveling, based on an assumption that the mobile communication terminal is more likely to proceed in the same or substantially the same direction that it is presently traveling.

29. A location based service system comprising:
a position information server; and
a mobile communication terminal in wireless communication with said position information server, wherein said position information server is configured to receive position information relating to the actual position of the mobile communication terminal and, after the lapse of a certain amount of time, calculate a predicted position value of the mobile communication terminal based on the received position, and wherein said mobile communication terminal comprises a global positioning system and a controller, said global positioning system configured to derive actual mobile communication terminal position and said controller configured to calculate a predicted position value, in the same manner as the position information server, and configured to compare the predicted position value to a current, actual position value, said mobile communication terminal configured to transmit to the position information server, depending on the result of the comparison, updated position information relating to the current, actual position of the mobile communication terminal;

wherein the position information related to the actual position includes information relating to at least one road to which the mobile communication terminal is proximately located; and wherein the position prediction performed by the mobile communication terminal controller and the position information server involves selecting one of at least two roads associated with an intersection, through which the mobile communication terminal is or will be traveling, and wherein the selection of one of the at least two roads is based on an assumption that the mobile communication terminal is more likely to proceed in the same or substantially the same direction that it is presently traveling.

30. A mobile communication terminal comprising:

a global positioning system configured to calculate, at a first time, actual mobile communication terminal position based on signals received from Global Positioning System satellites;

a controller configured to predict, at a second time subsequent to said first time, the position of the mobile communication terminal based on the calculated actual position, and based on mobile communication terminal velocity and motion angle, said controller further configured to compare the predicted position with an updated, actual position of the mobile communication terminal; and a transmitter transmitting position related information to a position information server based on the result of the comparison;

wherein the position related information includes information relating to at least one road to which the mobile communication terminal is proximately located; and wherein the position prediction performed by the mobile communication terminal controller involves selecting one of at least two roads associated with an intersection, through which the mobile communication terminal is or will be traveling, and wherein the selection of one of the at least two roads is based on an assumption that the mobile communication terminal is more likely to proceed in the same or substantially the same direction that it is presently traveling.

31. The mobile communication terminal as claimed in claim 30 further comprising:

a memory storing a road network database, wherein the position prediction performed by the mobile communication terminal controller is based on data contained in the road network database.

* * * * *